United States Patent [19]
Martin

[11] 3,877,104
[45] Apr. 15, 1975

[54] VEHICLE HEADLAMPS

[75] Inventor: Frederick Raymond Patrick Martin, Bromley, England

[73] Assignee: The Lucas Electrical Company Limited, Birmingham, England

[22] Filed: Jan. 5, 1973

[21] Appl. No.: 321,308

[30] Foreign Application Priority Data
Jan. 6, 1972 United Kingdom.................... 583/72

[52] U.S. Cl. ....... 15/250.02; 15/250.12; 15/250.17; 15/250 A
[51] Int. Cl. .............................................. B60s 1/46
[58] Field of Search ....... 15/250.01, 250.02, 250.12, 15/250.17, 250 A; 318/443, DIG. 2

[56] References Cited
UNITED STATES PATENTS

| | | | |
|---|---|---|---|
| 3,058,142 | 10/1962 | Pollock | 15/250.02 |
| 3,161,901 | 12/1964 | Kolb et al. | 15/250.02 |
| 3,667,082 | 6/1972 | Hoyler | 15/250.24 X |
| 3,795,936 | 3/1974 | Lane et al. | 15/250.27 |

FOREIGN PATENTS OR APPLICATIONS

| | | | |
|---|---|---|---|
| 1,181,572 | 11/1964 | Germany | 15/250.02 |
| 877,075 | 9/1961 | United Kingdom | 15/250.02 |

*Primary Examiner*—Peter Feldman
*Attorney, Agent, or Firm*—Fleit & Jacobson

[57] ABSTRACT

A vehicle headlamp cleaning system in which an electrically operated means for causing drive to a wiper blade is energised by a controller which is itself operated in response to a driver operation such as windscreen washing. The controller may additionally include a timer or counter for leaving the first means energised only during a limited number of cycles.

7 Claims, 7 Drawing Figures

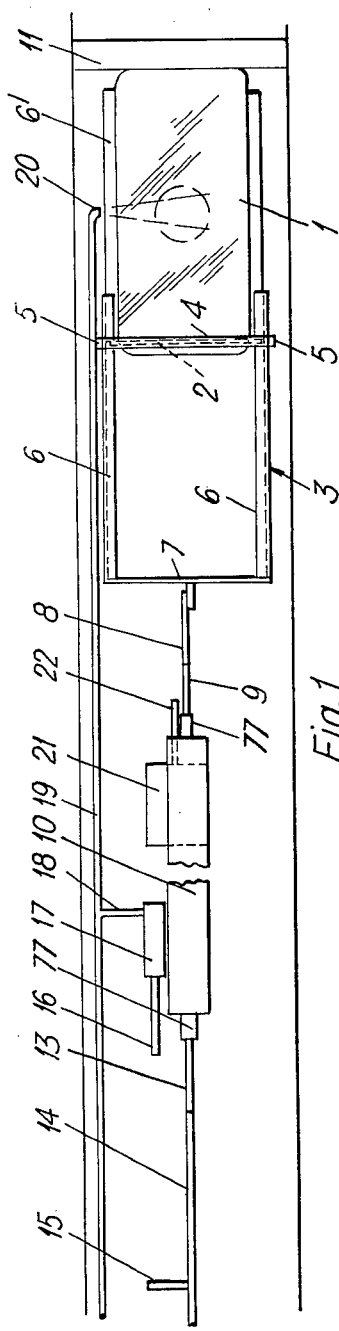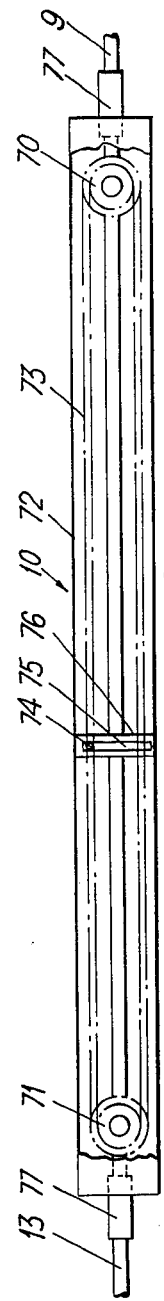

VEHICLE HEADLAMPS

THIS INVENTION relates to vehicle headlight cleaning systems and more especially to such systems in which a wiper blade sweeps the front of the vehicle headlamp.

According to the present invention there is provided a vehicle headlamp cleaning system including a headlamp wiper blade, and means for controlling the operation of a drive to the headlamp wiper blade, such drive controlling means comprising first means electrically energizable for causing driving of the wiper blade, and second means for initiating energization of the first means for a predetermined number of wiping operations upon a signal responsive to a driver operation. Conveniently the said signal may be produced in response to operation of the vehicle windscreen washer. With such an arrangement automatic operation of the lamp wiper will take place whenever the windscreen of the vehicle itself needs cleaning, this providing a convenient control of the wiping of the lamps as normally the windscreen needs washing and cleaning at least as frequently as the headlamps.

Preferably the second means includes a counter mechanism for maintaining the first means energized for a predetermined number of wiper operations after initiation of such energization. Conveniently the counter mechanism may comprise a pair of switch contacts which are closed for a predetermined number of wiper operations before being opened to de-energize the first means. While various arrangements may be used, one convenient system is for the counter mechanism to comprise a ratchet wheel and pawl mechanism incrementally advancable in response to operation of the wiper drive, such ratchet wheel opening the contacts after a predetermined number of advancing increments. With this arrangement the contacts remain open until such time as the ratchet wheel is again advanced through an increment to start a sequence of wiping operations responsive to energization of the first means.

If desired the first means may simply comprise an electric drive motor. Alternatively, the first means may comprise a solenoid energizable to cause connection of a mechanical drive, for example engagement of a drive wheel with a driven part of the vehicle engine.

The cleaning system may also include a water pump operable in response to wiping operations for applying a cleaning liquid to the headlamp to be cleaned.

A further aspect of the invention provides a wiper blade support system for a vehicle headlamp comprising a frame adapted to span the face of the lamp, means for securing the blade to the frame, and means for guiding the frame for movement across the lamp, such guide means being provided both top and bottom of the lamp for engagement with the frame. Preferably guide tracks are carried by the lamp for engagement by the frame and may conveniently comprise grooves or ridges applied to, or formed integrally with, the material of the lamp for engagement by the frame. Most conveniently the frame portion which engages the guide track may comprise a felt or plastics liner to ease the sliding movement of the frame along the guide tracks.

The invention will be further described, by way of example, with reference to the accompanying drawings, in which:

FIG. 1 is a diagrammatic front view of part of the wiper system applied to a vehicle headlamp;

FIG. 2 is a schematic front elevation of the reciprocating drive box;

Figure 3:
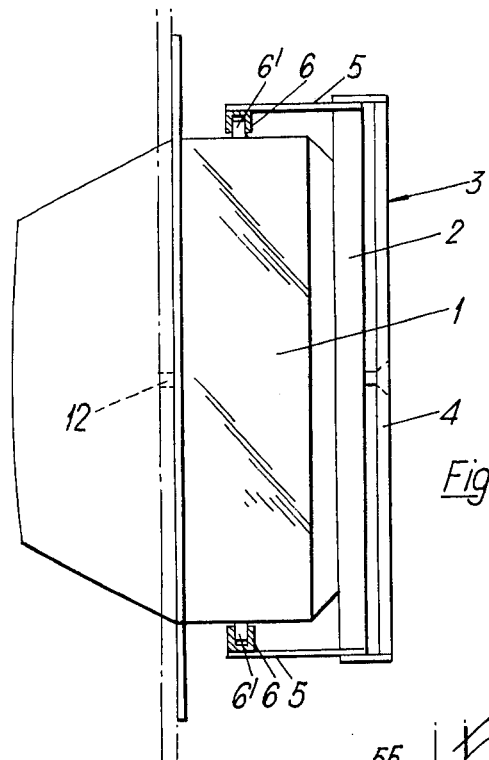
FIG. 3 is a side elevational view diagrammatically illustrating how a wiper blade is carried for movement transversely of the headlamp.

Referring to FIG. 1 a vehicle headlamp 1 is shown as having a blade 2 supported for reciprocating motion transversely thereof by means of a frame 3. The frame 3 comprises a vertical member 4 carrying the blade 2 and connected by legs 5, shown in FIG. 3, to two frame members 6 connected by a cross piece 7. The frame members 6 are of U section to engage runners 6' cast into the top and bottom of the glass of the lamp. A felt or plastics liner may be provided in the U-section to facilitate sliding movement of the frame 3 relative to the lamp 1. The cross member 7 is connected by rods 8 to a further drive rod 9 which is driven by means of an operating box 10 which is illustrated in FIG. 2. Basically this operating box comprises means for causing a reciprocating drive to be applied to the drive rod 9, and also to a rod 13, responsive to the provision of a rotary drive thereto. In FIG. 2, the box 10 is shown as including a pair of sprockets 70 and 71, the sprocket 70 being driven for rotation by a suitable power source such as the engine crankshaft drive take-off shown in FIG. 4. Alternatively a rotary electric motor may be used. The sprockets 70 and 71 are mounted in a box housing 72.

An endless chain 73 is mounted on the sprockets 70 and 71 so that, as sprocket 70 is driven, the sprocket 71 rotates at the same speed as an idler sprocket.

The chain 73 carries a pin 74, in this case an extended link pin of the chain, which is slidably received in a slot 75 of a slide 76 carried by the housing 72. The slot 75 extends perpendicular to the axes of the rods 9 and 13 which are themselves carried by the slide 76. The rods 9 and 13 are slidably supported by bushes 77 at the opposite ends of the housing 72.

As the chain circulates about the sprockets 70, 71 the pin 74 sliding in the slot 75 causes the slide 76 to reciprocate along the length of the housing 72 to drive the rods 9 and 13.

Connected to the rod 13 is a rod 14 passing across the vehicle to operate a further wiper for cleaning the headlamp at the other side of the vehicle. A pump actuating lever 15 projects from the rod 14 and is engageable towards the end of its rightward movement as shown in FIG. 1 with a projecting rod 16 from a water pump 17. Upon engagement of the lever 15 with the rod 16 the pump 17 operates to pump a small quantity of water through a tube 18 to a tube 19 which distributes the pumped water to water jets 20 at either side of the vehicle above the lamps to be cleaned. Accordingly with this arrangement a small quantity of water is deposited on the lamp responsive to each reciprocation of the lamp wiper blade 2.

As shown in FIG. 3 the lamp 1 is of the self-levelling type, that is it is mounted for rotation about a horizontal axis 12 whereby the angle of inclination of the lamp relative to the vehicle may be changed to take into account changes in attitude of the vehicle. Due to the fact that the wiper blade 2 is carried by a frame 3 which is itself supported by the lamp the lamp is free to pivot about the axis 12 without deleteriously affecting the relationship between the wiper blade 2 and the lamp. With this arrangement when the wiper 2 is parked it is shielded beneath a screen 11.

An automatic control box 21 is shown mounted on the operating box 10 and is operable for controlling energization, through an electrical connection 22, of a drive to the wiping mechanism. This automatic control box will be described in greater detail in relation to FIG. 5.

Figure 4:
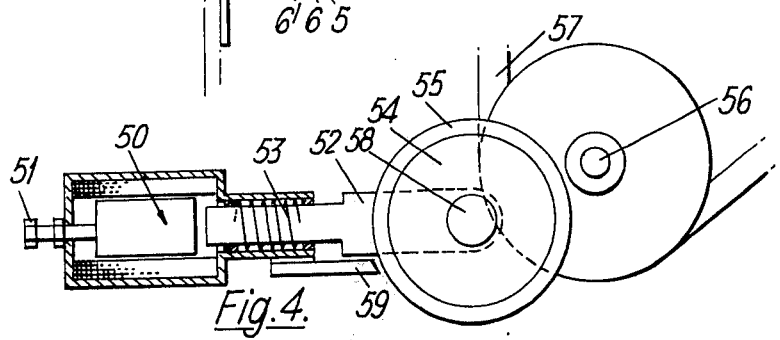
FIG. 4 is a diagrammatic view showing how the drive for the headlight cleaning system is taken mechanically from a moving part of the vehicle engine.

In FIG. 4 there is shown a drive for the cleaning system which comprises a wheel 54 having a rubber peripheral tyre 55 and mounted for movement into, and out of, engagement with the periphery of a drive shaft 56. As illustrated, this drive shaft 56 is the end of the engine crankshaft of the vehicle upon which is mounted the pulley for a belt 57 driving the fan and generator system of the vehicle. The wheel 54 has a rotatable axle 58 which is connected to a flexible drive connection passing to the sprocket wheel of the operating box 10. The axle 58 is rotatably carried by a reciprocable support member 52 the position of which is controlled by a solenoid 50 and a spring 53. Upon energization of the solenoid 50 the member 52 moves outwardly against the action of the spring 53 to engage the rubber tyre 55 with the shaft 56 so that the wheel 54 is rotatably driven by the shaft 56. Upon de-energization of the solenoid 50 the spring 53 returns the member 52 to retract the tyre 55 from the shaft 56 and into engagement with a brake 59. In order that the brake 59 may rapidly stop rotation of the wheel 54, the wheel is of low moment of inertia. An adjusting nut 51 is provided for adjusting the location of the solenoid 50 so as to control the length of stroke through which the member 52 may be advanced to engage the tyre with the shaft 56.

Figure 5:
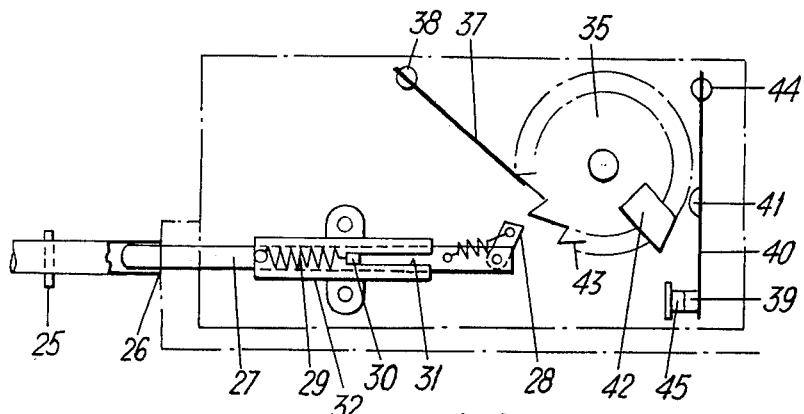
FIG. 5 is an enlarged diagrammatic view of a control box included in the system of FIG. 1.

The automatic control box shown in FIG. 5 comprises a rod 27 which is supported by a tube 32 having a slot extending axially of part of its length. A projection 30 extends from the rod 27 through the slot 31 and is engaged by one end of a tension spring 29 which has its other end secured to the tube 32. A projection 25 extends out through a slot 26 from the operating box so that upon reciprocation of the rods 13 and 9 the projection 25 intermittently contacts the end of the rod 27 to displace the rod 27 to the right against the action of the spring 29. Upon return movement of the projection 25 the rod is itself returned by the spring 29. A pawl 28 is mounted at the righthand end of the rod 27 for engagement with teeth 43 of a ratchet wheel 35. Incremental movements of the ratchet wheel 35 under the action of the pawl 28 are limited by a leaf spring arm 37, secured at one end 38 to the housing of the automatic control box. Controllable by the ratchet 35 are two relatively movable electrical contacts 45 and 39, the movable contact 39 being carried by a spring arm 40 to be displaceable out of engagement with the fixed contact 45 by engagement of a projection 42 on the ratchet wheel with a projection 41 on the spring arm 40. With this arrangement, when the ratchet wheel is positioned with the projection 42 in engagement with the pin 41 the contacts 45 and 39 are disengaged while at all other rotational positions of the ratchet wheel the contacts 45 and 39 are in engagement.

Figure 6:
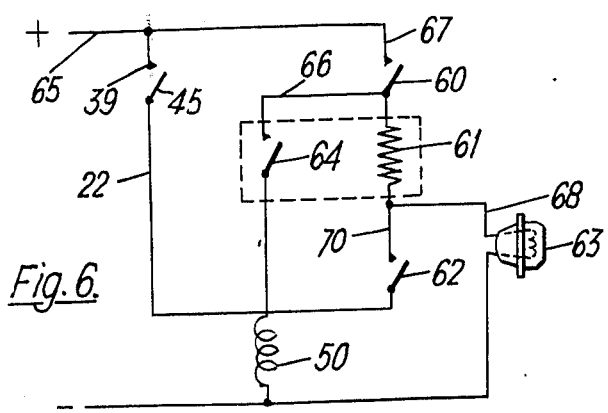
FIG. 6 is an electrical circuit diagram illustrating the arrangement for the electrical control of operation of the cleaning system.

FIG. 6 illustrates the electrical arrangement and shows a positive line 65 having three parallel connections to the solenoid 50. One of these connections includes the contacts 39 and 45 in a line 22. A second comprises a line 66 containing a switch 64 and the third comprises a heating coil 61 closely adjacent a bimetal (not shown) connected to open switch 64 on heating up by coil 61. A third line 70 leading through the vehicle windscren washer switch 62 to the solenoid 50. Both the second and third parallel connections are connected to the positive input line 65 by a feeder line 67 containing a switch 60. A line 68 leads from the coil 61 through the headlamp 63 back to earth.

The switch 60 is the conventional main on/off switch for the vehicle headlamp 63 while the switch 62 is connected to be actuated in response to operation of the vehicle windscreen washer.

Operation of this system will now be described. In the normal rest position the ratchet wheel 35 is positioned with its projection 42 in engagement with the projection 41 to hold the contacts 45 and 39 open. While the vehicle lights are switched off there are no means of energizing the solenoid 50 to cause drive to be applied to the operating box 10 so that there are no means of advancing the ratchet wheel 35 to a position in which it will in any case itself connect power to the solenoid 50 via the contacts 45 and 39.

In order to initiate operation of the wiper blades the vehicle headlamps must be switched on by means of switch 60. When this is initially closed the switch 64 will be in a closed position to supply power to the solenoid 50 to commence drive to the operating box 10 resulting in initial rotation of the ratchet wheel 35. At the same time closure of the switch 60 causes current to flow through the heating coil 61 to the lead 68 and through the headlamp 63 to earth. The switch 64 is controlled by a bimetal, or indeed it may itself comprise a flexible bimetal contact arm, and is so arranged that shortly after closing of the switch 60 sufficient heat will be generated in the coil 61 to cause the bimetal to open the switch 64.

By this time the ratchet wheel 35 is sufficiently advanced for the contacts 39 and 45 to have closed to cause continued energization of the solenoid 50 until these contacts are again opened by the next engagement of the projection 42 with the projection 41 on the contact arm 40 after a full revolution of the wheel 35.

Subsequent energization of the wiping and washing mechanisms will occur whenever switch 62 is closed responsive to operation of the vehicle windscreen washer and will cause operation of the drive to advance the ratchet wheel 35 to close again the contacts 45 and 39 so that the wiper mechanism can move through a predetermined number of operations as determined by the number of teeth on the ratchet wheel until the contacts 45 and 39 are again opened.

While 12 teeth have been shown in the drawing, in many instances it has been found that eight wiping operations are, in fact, most suitable. Of course small changes can be made to the ratchet wheel, for example it could be provided with two projections 42 so that the predetermined number of wiping operations is six, the ratchet wheel 35 rotating through half a revolution for each series of operations, or alternatively more ratchet teeth may be provided on the wheel with two or more projections 42 provided about the periphery of the wheel to control the predetermined number of wiping operations in each sequence of operations for automatic switching off upon opening of the contacts 45 and 39.

Instead of the ratchet wheel arrangement alternative means may be provided for sequencing the wiping operations, for example semi-conductor switching devices may be used to count the operations before switching off, an electrical signal being required to initiate a fresh operating and counting sequence.

As described a thermally operated time delay switch 64, 61 is used in the circuit of FIG. 6. However alternative time delay means may be used provided that the switch 64 is such that it only closes for a short time following switching on of the vehicle headlamp by closing of the switch 60.

Where the windscreen washers are other than electric driven the switch 62 may be associated with whatever washer operating system is provided so that switch 62 closes as the washers are operated.

Figure 7:
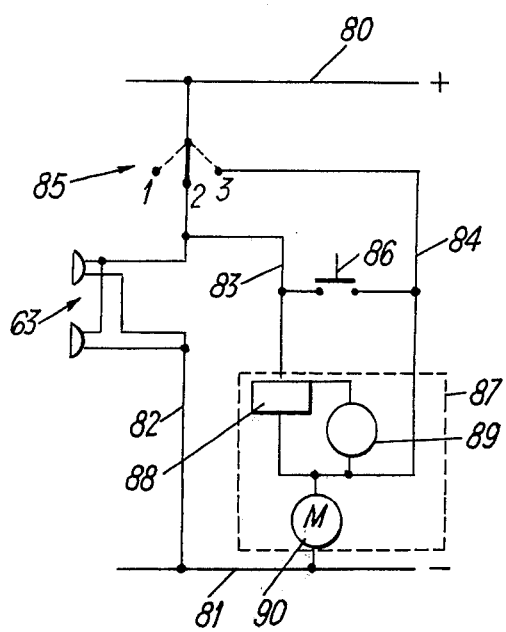
FIG. 7 is a diagram, similar to FIG. 6, but showing an alternative control system.

An alternative form of control circuit is shown in FIG. 7 and is similar to that of FIG. 6. In this case the main positive and negative supply conductors 80 and 81 again have three parallel shunts 82, 83, and 84 all connected via a main switch 85 which also controls the headlamps 63.

One of the shunts 82 includes the headlamps 63. A second shunt 83 includes both a counter switch 88, in this case incorporated in the drive housing of an electric drive motor 87, and also a parking switch 89 of the same drive motor, these two switches being connected in a parallel pair but in series with the windings 90 of the motor. The third shunt 84 bypasses the switches 88 and 89 but is also in series with windings 90. The windscreen washer switch 86 is in a bridge between the two shunts 83 and 84.

The headlamp switch 85 is in this case a three position switch having an off position 1 a headlamp "on" position 2 and a headlamp "wash-wipe" position 3 away from which the switch rocker is spring biases. The switch may additionally have a fourth "side lamps on" position if desired. Normally when the headlamps are switched on the switch will be operated to the "wash-wipe" position 3 before the rocker swings back into the "on" position 2 and this will operate the motor 87. Subsequently, whenever the headlamps are on the switch 85 may again be moved temporarily into the "wash-wipe" position 3 and then released if it is desired to clean the lamps.

However whenever the headlamps are on with switch 85 in position 2 and the windscreen washers are operated the switch 86 will temporarily close and this will supply power from shunt conductor 83 to conductor 84 to energise the motor windings 90.

The motor 87 has a park switch 89 in the form of a contact breaker which opens to de-energise the windings 90 at the desired part of a cycle, and a counter switch 88, similar to the control switch formed by ratchet wheel 35 and the contact breakers 39, 45 of FIG. 5, in order to determine during which particular cycle the motor should stop. Thus the switches 88 and 89 are in parallel so that the motor is only de-energised when both switches 88 and 89 are open.

In order to provide a better understanding of the embodiment illustrated in FIG. 7, there now follows a description of the operation of this particular form of device. Normally, with the headlamps off, the switch 85 is in position 1 and no current flows between conductors 80 and 81.

Where it is desired to switch the headlamps on, the switch 85 must be moved to position 2 in order to connect conductors 80 and 81 across the lamps 63. A preferred form of the switch 85 is one in which position 2 can only be attained when the switch is being returned from position 3. Thus the headlamp "wash-wipe" position must be selected first whenever the headlamps are switched on otherwise the headlamps will not be energised. The construction of such a switch does not form part of the present invention and will not be described in detail. However, whether or not such a switch is fitted it is clearly desirable that the switch 85 be first moved to position 3 before arriving at position 2 so that whenever the lamps are switched on a lamp wash and wipe cycle is initiated.

When the switch 85 is placed in position 3 no current willl flow through the lamps 63 but instead the conductors 80 and 81 will be connected by way of the line 84 which shunts the counter and park switches 88 and 89, respectively, to feed the motor windings 90. Thus, despite the fact that on commencement of this cycle the switches 88 and 89 will both be in the "contact open" position, even the shortest duration selection of position 3 will be sufficient to start the rotation of the motor 87 such that, when the switch 85 is moved back to position 2, the de-energisation of line 84 will come too late to prevent departure of the parking switch 89 from its "contact open" position so that current will be able to flow through the line 83 and switch 89 to continue energising the motor winding 90.

By the time the park switch 89 next arrives at its "park" position the counter switch 88 will itself have departed from its "contact open" position to hold the motor windings 90 energised until such time as the motor has executed the required number of cycles, in this case six, to cause the counter and park switches 88 and 89 to arrive simultaneously at their "contact open" positions. In such positions of the switches 88 and 89, with the switch 85 in position 2, current can no longer flow through the motor windings 90 but the headlamps 63 will nevertheless be energised.

If at any time while switch 85 is in position 2 the driver operates the normal vehicle windscreen washers the switch 86 will temporarily close, allowing current to flow from line 83 across into line 84 via the switch 86 to bypass the counter and park switches 88 and 89 for energising the windings 90. Here again, even the shortest power pulse will be sufficient to trigger operation of the motor for the desired number of cycles to be measured by the counter switch 88.

Finally, the driver has a manual over-ride on operation of the headlamp wipers in that at any time during normal operation of the vehicle he can move switch 85 into position 3 in order to trigger the predetermined counted number of cycles without needing to operate the windscreen washer.

The parking switch 89 of FIG. 7 preferably includes a third contact which energises a spray nozzle and pump to wash the headlamp glasses. In this way, while the motor is executing its normal operating routine to carry out six consecutive cycles of the headlamp wipers, each time the parking switch 89 passes through its parked position (illustrated in FIG. 7) the pump is energised briefly to apply a spray or jet of water onto the wiped surface to assist in the cleaning action of the wiper blades.

In a preferred form of the headlamp wiping system of the present invention it is envisaged that the headlamps will have wipers of an arcuate, semi-circular configuration when viewed from the front in order that in the parked position of each wiper blade the blade conforms to one half of the periphery of the lamp. In this way the available space at the front of the vehicle is used with much greater economy.

When using the control circuit of FIG. 7, the drive motor will be a continuously rotating type and it will be necessary to include some reciprocating mechanism such as the operating box 10 of FIG. 2. A suitable alternative form of reciprocating mechanism is a pantograph linkage.

With either of the two reciprocating units described above or with any other suitable reciprocating mechanism, it is of course possible to drive rotary wiper blades for oscillatory rotation in order that they may execute oscillatory wiping movement on the headlamp glass. Such blades would be mounted so as to be rotatable about axes generally parallel to the lamp beam axes.

Equally, either the reciprocatory or the rotary oscillatory form of blade can be employed to wipe a screen in front of the headlamp glass rather than the glass itself.

I claim:

1. A vehicle including a headlamp; a wiper blade mounted for sweeping motion across said headlamp; electric motor means; current conducting windings to said motor means; means drivably connecting to said motor means to said wiper blade; a park switch operable to de-energise the electric motor means upon completion of a single cycle consisting of one or more revolutions of the motor; a counter switch wired in parallel with the park switch and constructed to maintain its contacts closed throughout a predetermined number of said cycles of the motor; conductor means connecting said windings and said park and connector switches to the vehicle electrical supply; and a normally open switch connected to the vehicle headlamp electric circuit and said conductor means for interrupting said conductor means and operable to close in response to energization of the vehicle headlamp.

2. A vehicle as set forth in claim 1, wherein said counter switch includes a pair of switch contacts which are closed for a predetermined number of wiper operations before being opened to de-energise the first means, and a ratchet wheel and pawl mechanism incrementally advanceable in response to operation of the wiper drive, such ratchet wheel opening said contacts after a predetermined number of advancing increments.

3. A vehicle as set forth in claim 1, and further including a nozzle arranged to direct a jet onto said headlamp, and a water pump operable for applying a cleaning liquid to the nozzle.

4. A vehicle as set forth in claim 1, and further including: a conductor connected in parallel with said counter switch and said park switch, a second conductor feeding the parallel pair of switches, means for energizing said second conductor only when the headlamps are operated, and means for optionally energizing said first conductor at other times when said headlamps are de-energized.

5. A vehicle as set forth in claim 4, and including a switch operated by the windscreen washer and connected across said first and second conductor for energising said first conductor when the windscreen washer switch is operated and the headlamps are energised.

6. A vehicle as set forth in claim 1 and further comprising: a frame adapted to span the face of said headlamp; means for securing said wiper blade to the frame; and guide means provided at both top and bottom of said headlamp for engagement with the frame for guiding the frame for movement across said headlamp.

7. A vehicle as set forth in claim 1 and further including windscreen washer means, and a further normally open switch connected to said conductor means and said windscreen washer means to be closed during use of the vehicle windscreen washer.

\* \* \* \* \*